(12) United States Patent
Dotan et al.

(10) Patent No.: US 8,799,655 B1
(45) Date of Patent: Aug. 5, 2014

(54) MOBILE OFFLINE AUTHENTICATION USING ONE-TIME PASSCODES

(71) Applicant: EMC Corporation, Hopkinton, MA (US)

(72) Inventors: Yedidya Dotan, Newton, MA (US); Jennifer Chong, Bedford, MA (US); Jonathan Wu, Newton, MA (US); David D. Taku, Nashua, NH (US)

(73) Assignee: EMC Corporation, Hopkinton, MA (US)

( * ) Notice: Subject to any disclaimer, the term of this patent is extended or adjusted under 35 U.S.C. 154(b) by 8 days.

(21) Appl. No.: 13/627,224

(22) Filed: Sep. 26, 2012

(51) Int. Cl.
*H04L 9/00* (2006.01)
*H04K 1/00* (2006.01)
*H04L 9/32* (2006.01)

(52) U.S. Cl.
USPC ............................... 713/168; 726/2; 380/270

(58) Field of Classification Search
CPC ... H04L 63/067; H04L 63/0838; H04L 63/08; H04L 9/08; H04L 9/22; G06F 21/31; G06Q 20/341
USPC ...................... 726/2–9, 16–20; 713/168, 184; 380/270, 44, 46, 255
See application file for complete search history.

(56) References Cited

U.S. PATENT DOCUMENTS

| 7,849,323 | B2 | 12/2010 | Field et al. |
| 7,904,946 | B1 | 3/2011 | Chu et al. |
| 7,979,707 | B2 | 7/2011 | Rostin et al. |
| 8,006,300 | B2 | 8/2011 | Mizrah |
| 8,151,335 | B2 | 4/2012 | Wankmueller et al. |
| 8,413,221 | B2 | 4/2013 | Kaliski, Jr. et al. |
| 8,478,990 | B2 | 7/2013 | Brown et al. |
| 8,533,118 | B2 | 9/2013 | Weller et al. |

*Primary Examiner* — Hosuk Song
(74) *Attorney, Agent, or Firm* — BainwoodHuang

(57) ABSTRACT

A technique of authenticating a user involves storing a set of expected OTPs in memory of a mobile device, the set of expected OTPs having been previously generated by and acquired from an external authentication server. The technique further involves receiving, after the set of expected OTPs is stored in the memory, an authentication request from a user of the mobile device, the authentication request including a user-provided OTP. The technique further involves performing, by processing circuitry of the mobile device, a local authentication operation which provides an authentication result based on a comparison between the user-provided OTP and an expected OTP of the set of expected OTPs stored in the memory. The authentication result indicates whether authentication of the user is successful or unsuccessful.

20 Claims, 5 Drawing Sheets

| | START TIME FIELD 62 (YY:MM:DD:HH:mm) | END TIME FIELD 64 (YY:MM:DD:HH:mm) | EXPECTED OTP FIELD 66 (E.G., EIGHT CHARACTERS) | OTHER FIELDS 68 (E.G., USER ID, SERVER ID, ETC.) |
|---|---|---|---|---|
| 60(1) | 12:09:12:08:39 | 12:09:12:08:41 | abc654gh | ... |
| 60(2) | 12:09:12:08:40 | 12:09:12:08:42 | xYz123mm | ... |
| 60(3) | 12:09:12:08:41 | 12:09:12:08:43 | 1a2B3c56 | ... |
| 60(4) | 12:09:12:08:42 | 12:09:12:08:44 | 321Zyx12 | ... |
| 60(5) | 12:09:12:08:43 | 12:09:12:08:45 | 444555st | ... |
| 60(6) | 12:09:12:08:44 | 12:09:12:08:46 | 88KK99MM | ... |
| 60(7) | 12:09:12:08:45 | 12:09:12:08:47 | 0f9e8d7c | ... |
| 60(8) | 12:09:12:08:46 | 12:09:12:08:48 | qrst7890 | ... |
| ... | ... | ... | ... | ... |

FIG. 2

MOBILE OFFLINE AUTHENTICATION USING ONE-TIME PASSCODES

BACKGROUND

When a user of a conventional smart phone wishes to obtain access to a protected computerize resource of the smart phone, the user may need to provide a one-time passcode (OTP) (e.g., by reading the OTP from a hardware token and manually entering the OTP into the smart phone). The smart phone then sends the OTP over a network (e.g., a computer network, a cellular network, etc.) to an authentication manager. If the authentication manager is able to match the OTP from the user to an expected OTP, the authentication manager provides an authentication signal indicating that the user has successfully authenticated and allowing the user to access the protected computerize resource. However, if the authentication manager is unable to match the OTP from the user to the expected OTP, the authentication manager provides an authentication signal indicating that user authentication is unsuccessful and denying access to the protected computerized resource. In some situations, the user is then able to retry authentication or is challenged to authenticate in a different manner (e.g., step up authentication).

Similarly, when a user of a conventional desktop computer wishes to obtain access to a protected computerized resource, the user may need to provide an OTP to the conventional desktop computer. The conventional desktop computer then sends the OTP to an authentication manager over a network. In some situations, if authentication with the authentication manager is successful, the authentication manager provides the user with access to the protected computerize resource as well as loads a day file containing a day's worth of future OTPs into the desktop computer. With the day file loaded into the desktop computer, the user is able to locally authenticate within the same day at the desktop computer using the day file without needing to communicate again with the authentication manager. In some situations, the authentication manager loads a week's worth of OTPs (e.g., multiple day files) into the desktop computer.

SUMMARY

Unfortunately, there are deficiencies to the above-described conventional authentication approaches. In particular, conventional smart phones require network access to authentication managers during authentication even though many user activities are typically performed in an offline mode (e.g., reading documents, playing games, etc.). Additionally, from the perspective of an authentication manager receiving authentication requests, the authentication manager may be required to respond to waves of uneven authentication request demand (e.g., high demand during popular use times such as in the middle of the day, low demand during unpopular use times such as late at night or very early in the morning, and so on).

Furthermore, in connection with conventional desktop computers using day files for local authentication within the same day, such features may provide better security vis-à-vis static passwords and personal identifications numbers (PINs), etc. However, the delivered value from using day files may be marginal since most desktop computers have constant network access nowadays.

In contrast to the above-described conventional authentication approaches, improved techniques involve locally authenticating users of mobile devices by comparing user-provided one-time passcodes (OTPs) with expected OTPs stored within the mobile devices. Such expected OTPs may be routinely generated by and distributed from external authentication servers at times which are transparent to mobile device users (e.g., generated and distributed in a load balanced manner over a 24 hour period). Moreover, due to possible frequent online/offline transitions by the mobile devices, such expected OTPs can be buffered by proxy equipment, and then delivered from the proxy equipment to the mobile devices during online times of convenience.

One embodiment is directed to a method of authenticating a user which is performed in a mobile device. The method includes storing a set of expected OTPs in memory of the mobile device, the set of expected OTPs having been previously generated by and acquired from an external authentication server. The method further includes receiving, after the set of expected OTPs is stored in the memory, an authentication request from a user of the mobile device, the authentication request including a user-provided OTP. The method further includes performing, by processing circuitry of the mobile device, a local authentication operation which provides an authentication result based on a comparison between the user-provided OTP and an expected OTP of the set of expected OTPs stored in the memory. The authentication result indicates whether authentication of the user is successful or unsuccessful.

In some arrangements, storing the set of expected OTPs in the memory of the mobile device includes saving, in the memory, an OTP file holding multiple time-indexed OTPs as the set of OTPs, each time-indexed OTP corresponding to a respective window of time. In these arrangements, performing the local authentication operation includes obtaining a current time value and identifying, from the OTP file, particular time-indexed OTPs corresponding to windows of time covering the current time value. Performing the local authentication operation further includes comparing the user-provided OTP to each time-indexed OTP of the particular time-indexed OTPs to determine whether authentication of the user is successful or unsuccessful.

Another embodiment is directed to a method, performed within proxy equipment, of delivering a set of expected OTPs from an external authentication server to a mobile device to enable user authentication. The method includes receiving, by a local authentication client of the proxy equipment, the set of expected OTPs through a first communications channel established between the local authentication client and the external authentication server. The method further includes buffering, at least temporarily, the set of OTPs in dedicated memory of the local authentication client of the proxy equipment. The method further includes conveying, by a mobile device module of the proxy equipment, the set of expected OTPs from the dedicated memory of the local authentication client to the mobile device through a second communications channel established between the mobile device module and the mobile device.

It should be understood that portions of the proxy equipment and/or the external authentication server can reside in the cloud. In this cloud context, the infrastructure is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various processes, electronic components and circuitry which are involved in authentication in mobile devices using OTPs, i.e., one-time use strings of characters and/or numbers which are intended to be accessible only to the user and the authentication server.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram of example contents of an OTP file which is provided by an external authentication server and stored in a mobile device of the electronic environment of FIG. 1.

DETAILED DESCRIPTION

An improved technique involves locally authenticating a user of a mobile device by comparing a user-provided one-time passcode (OTP) with an expected OTP stored within the mobile device. To this end, expected OTPs may be routinely generated by and distributed from an external authentication server at times which are transparent to the mobile device user (e.g., generated and distributed in a load balanced manner over a 24 hour period). Moreover, due to possible frequent online/offline transitions by the mobile device, such expected OTPs can be buffered by proxy equipment, and then delivered from the proxy equipment to the mobile device during online times of convenience.

Figure 1:
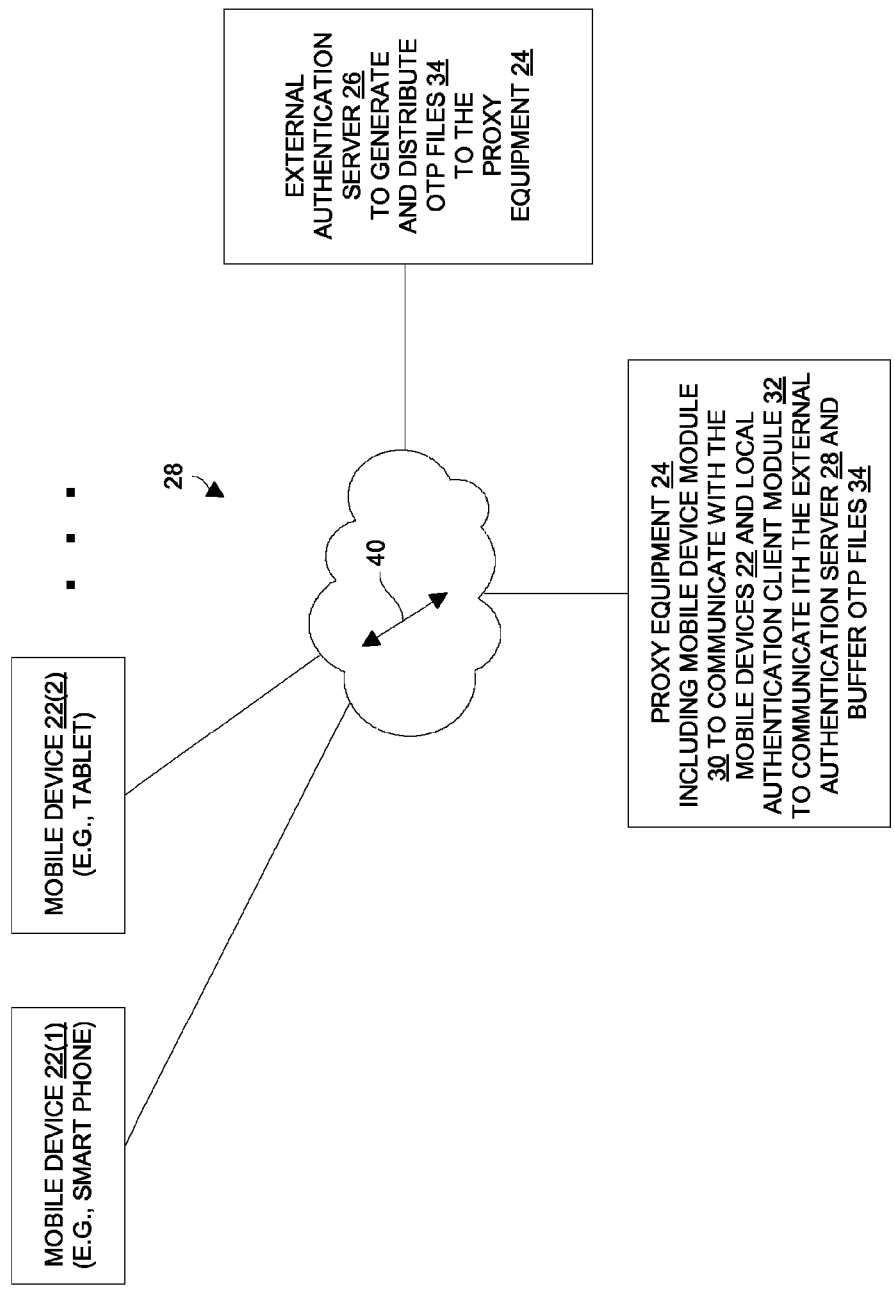
FIG. 1 is a block diagram of an electronic environment which enable mobile offline authentication using one-time passcodes (OTPs).

FIG. 1 shows an electronic environment 20 which enables mobile offline authentication using OTPs. The electronic environment 20 includes mobile devices 22(1), 22(2), ... (collectively, mobile devices 22), proxy equipment 24, an external authentication server 26, and a communications medium 28.

The mobile devices 22 allow users to authenticate and, if authentication is successful, access protected computerized resources (e.g., to run protected applications, to read or modify protected data, etc.). By way of example, the mobile device 22(1) is a smart phone. Additionally, the mobile device 22(2) is a tablet, and so on. As will be explained in further detail shortly such authentication may be performed locally in some situations and remotely in other situations.

The proxy equipment 24 is constructed and arranged to operate as an intermediate device between the mobile devices 22 and the external authentication server 28. In particular, the proxy equipment 24 includes a mobile device module 30 to communicate with multiple mobile devices 22, and local authentication client module 32 to communicate with the external authentication server 28 and buffer OTP files 34 for conveyance to the mobile devices 22.

In some arrangements, the proxy equipment 24 is dedicated to operating as a front-end to the external authentication server 28. In other arrangements, the proxy equipment 24 provides additional services such as access to protected computerized resources which are external to the mobile devices 22 when users have successfully authenticated (e.g., access to online financial accounts, ability to complete online purchases, VPN access, virtual machine access, etc.). In yet other arrangements, the proxy equipment 24 performs other operations relating to the electronic environment 20 such as network routing, network address translation between network segments, gateway operability, etc.

The external authentication server 26 is constructed and arranged to generate and provide the OTP files 34 to the proxy equipment 24. As will be explained in further detail shortly, each OTP file 34 holds expected OTPs to enable local user authentication by a particular mobile device 22 once that OTP file 34 is properly stored on that particular mobile device 22. In some arrangements, the external authentication server 26 is further constructed and arranged to perform authentication operations to authenticate users in real time for greater flexibility within the electronic environment 20.

The communications medium 28 connects the various components of the electronic environment 20 together to enable the various components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, or combinations thereof.

During operation, the mobile devices 22 may transition between online and offline states. For example, a mobile device 22 may move out of range of a wireless network or lose cellular coverage and thus go offline from the perspective of the other components such as the proxy equipment 24 and the external authentication server 26. As another example, the user of the mobile device 22 may turn off the mobile device 22 (i.e., power off the mobile device) or otherwise disable the mobile device 22 from obtaining online access (i.e., deactivate network access). While a mobile device 22 is offline, the mobile device 22 may be able to perform local user authentication to permit/deny access to a protected resource if that mobile device 22 was provisioned with an OTP file 34 prior to going offline.

In some arrangements, a mobile device 22 obtains an OTP file 34 by successfully authenticating online with (i) the proxy equipment 24 or (ii) the external authentication server 28 through the proxy equipment 24. For example, a user may authenticate with the proxy equipment 24 as part of an operation or transaction such as when completing a purchase at an online store. If user authentication is successful, the proxy equipment 24 not only completes the transaction, but also delivers an OTP file 34 containing expected OTPs to the mobile device 22 through the proxy equipment 24 in order to provision the mobile device 22 for offline local user authentication in the future (e.g., to browse a downloaded online store catalog, etc.). As another example, the user may authenticate with the proxy equipment 24 (or indirectly with the external authentication server 26 through the proxy equipment 24) for the sole purpose of obtaining the OTP file 34 of expected OTPs to enable offline local user authentication in the future.

In other arrangements, a mobile device 22 obtains an OTP file 34 by querying the proxy equipment 24 for an OTP file 34 that had been buffered earlier by the proxy equipment 24 on behalf of the mobile device 22. Here, the user may have signed up for a subscription or service, and the OTP file 34 may be transparently delivered from the proxy equipment 24 to the mobile device 22 via a background task (rather than burden the user to successfully authenticate). Such operation is less burdensome on the user can run at opportune moments when the mobile device 22 is connected to the communications medium 28. For example, the mobile device 22 may poll the proxy equipment 24 daily, hourly, etc. for a new OTP file 34. As another example, the mobile device 22 may poll the proxy equipment 24 for a new OTP file 34 when turned on, upon detection of wireless access, during times of low activity such as after being turned on but sitting inactive for more than a minute, and so on. Further details will now be provided with reference to FIG. 2.

FIG. 2 shows example contents of an OTP file 34 which is provided by an external authentication server 26, temporarily buffered by the proxy equipment 24, and stored in a mobile device 22 for use in mobile offline authentication. The OTP file 34 includes a series of time-indexed OTP entries 60(1), 60(2), 60(3), . . . (collectively, time-indexed OTP entries 60).

Each time-indexed OTP entry 60 includes a start time field 62, an end time field 64, an expected OTP field 66, and other fields 68. The start time field 62 of each entry OTP 60 is constructed and arranged to hold a start time for that OTP entry 60. Similarly, the end time field 64 of each OTP entry 60 is constructed and arranged to hold an end time for that OTP entry 60. The expected OTP field 66 of each OTP entry 60 is constructed and arranged to hold an expected OTP for that OTP entry 60. Although the OTPs are shown as being eight characters (or alphanumeric digits) in length, other lengths are suitable for use as well (e.g., six, ten, etc.).

Together, the start and end times for each OTP entry 60 define a valid time window for the expected OTP of that OTP entry 60. For example, entry 60(3) holds an expected OTP "1a2B3c56" and the time window fields 62, 64 of that entry 60 define a valid time window from 08:41 A.M. to 08:43 A.M on Sep. 12, 2012. By way of example only, the time window fields 62, 64 store time using a format of YY:MM:DD:HH:mm to represent time where YY is the year, MM is the month, DD is the day, HH is the hour, and mm is the minute. Other time formats are suitable for use as well.

Each OTP entry 60 further includes additional fields 68 to hold additional information. Example of such additional information include a user identifier (ID) or other destination information of the user to distinguish among multiple users, a server ID or other source information of the external authentication server 26 that generated the expected OTP to distinguish among multiple external authentication servers 26, an ID of the proxy equipment 24 to distinguish among multiple proxy equipment installations, and so on.

It should be understood that the series of OTP entries 60 within the OTP file 34 cover a predefined amount of time (e.g., an hour, a day, a month, etc.). Additionally, overlap among the time windows exists between adjacent OTP entries 60. This is, by way of example, each expected OTP is valid for a three minute time window, and its validity overlaps with that of its neighboring expected OTPs. For example, at 08:42 A.M on Sep. 12, 2012, OTP entries 60(2), 60(3), and 60(4) hold valid expected OTPs. Accordingly, if a user-provided OTP matches any of the expected OTPs in OTP entries 60(2), 60(3), or 60(4), authentication is considered successful. However, if the user-provided OTP does not match any of the expected OTPs in OTP entries 60(2), 60(3), and 60(4), authentication is considered unsuccessful.

It should be appreciated that the above-provided schema accounts for variations in time among devices. Accordingly, even if the clock in the user token source (e.g., a hardware token) is off by a minute from the clock used by the mobile device 22, this schema will still enable the user-provided OTP to match at least one expected OTP from the OTP file 34. This level of tolerance is adjustable by adjusting the size of the valid time windows (e.g., increasing/decreasing the time window from three minutes). Further details will now be provided with reference to FIG. 3.

Figure 3:
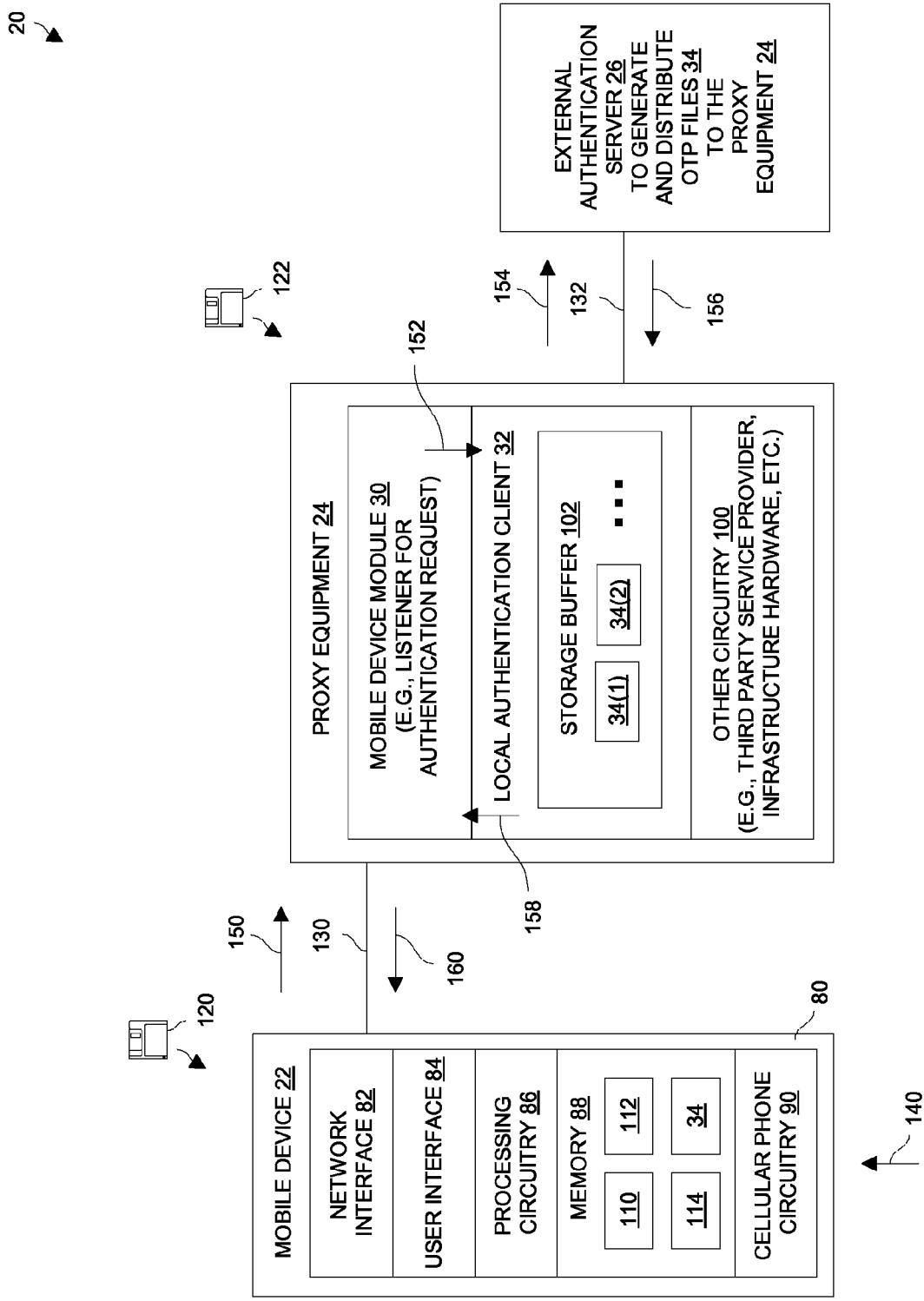
FIG. 3 is a block diagram illustrating a sequence of activities that occurs in an online authentication situation.

FIG. 3 shows particular details of components of the electronic environment 20 which are involved in various authentication-related activities. As shown in FIG. 3, the mobile device 22 includes a mobile device housing 80, a network interface 82, a user interface 84, processing circuitry 86, memory 88, and cellular phone circuitry 90. The mobile device housing 80 has a handheld form factor (e.g., in the shape of a smart phone, a tablet, etc.) for enhanced compactness and mobility. In some arrangements, several components are tightly integrated together (e.g., share a common IC package, reside on the multichip module or the same circuit board, etc.), and derive support and/or protection from the mobile device housing 80.

As further shown in FIG. 3, the proxy equipment 24 includes the earlier-mentioned mobile device module 30 and local authentication client module 32 which are linked together, as well as other circuitry 100 such as equipment for a third party server (e.g., a web server, a database server, protected computerized resources, infrastructure hardware, and so on). Additionally, the local authentication client module 32 includes a storage buffer 102 which enables the proxy equipment 24 to buffer OTP files 34(1), 34(2), . . . from the external authentication server 26 for distribution to multiple mobile devices 22 when the mobile devices 22 come online from the perspective of the proxy equipment 24.

In connection with the mobile device 22, the network interface 82 is constructed and arranged to connect the mobile device 22 to the communications medium 28 (also see FIG. 1). In some arrangements, the network interface 82 includes circuitry for different types of wireless communications such as WiFi and cellular telephony. Accordingly, the network interface 60 enables the mobile device 22 to communicate with the other components of the electronic environment 20 such as the proxy equipment 24.

The user interface 84 of the mobile device 22 is constructed and arranged to receive user input and provide user output (IO). Display screens, push button keyboards, capacitive touch displays, and the like are suitable for use as the user interface 84.

The memory 88 of the mobile device 22 is constructed and arranged to store a variety of software constructs including an operating system 110, an authentication application 112, data for protected computerized resources 114 (e.g., documents, restricted applications, games, etc.), OTP files 34, and other objects (e.g., other applications, documents, etc.).

The processing circuitry 86 is constructed and arranged to operate in accordance with the software constructs stored in the memory 88. In particular, when the processing circuitry 86 runs the operating system 110, the processing circuitry 86 provides a secure electronic platform on which a user is able to perform useful work. This electronic platform is capable of implementing strong security and partitioning, e.g., operating as a container to protect data and requiring successful user authentication before permitting access. Along these lines, when the processing circuitry 86 runs the authentication application 112, the processing circuitry 86 communicates with the proxy equipment 24 in a controlled and secure manner (e.g., to obtain an OTP file 34), as well as performs user authentication operations (e.g., local and/or remote authentication) to control access to protected computerized resources.

The cellular phone circuitry 90 allows the user to establish cellular phone calls with other callers having remote devices. In some arrangements, the cellular phone circuitry 90 is able to run independently and concurrently with user authentication activity. In other arrangements, access to the cellular phone circuitry 90 is one of the protected computerized resources that requires successful user authentication.

It should be understood that the processing circuitry 86 may include one or more processors running specialized software, application specific ICs (ASICs), field programmable gate arrays (FPGAs) and associated programs, discrete components, analog circuits, other hardware circuitry, combinations thereof, and so on. In the context of a processor running specialized software, a computer program product 120 is capable of delivering all or portions of the software to the mobile device 22. The computer program product 120 has a non-transitory (or non-volatile) computer readable medium which stores a set of instructions which controls one or more operations of the mobile device 22. Examples of suitable computer readable storage media include tangible articles of manufacture and apparatus which store instructions in a non-volatile manner such as CD-ROM, flash memory, disk memory, tape memory, and the like.

Likewise, the proxy equipment 24 may be implemented using processing circuitry which is capable of operating in accordance with a control application that is delivered via a computer program product 122. The computer program product 122 also includes a non-transitory (or non-volatile) computer readable medium which stores a set of instructions to control one or more operations of the proxy equipment 24.

It should be understood that the various components communicate with each other via the communications medium 28 (also see FIG. 1). To this end and as shown in FIG. 3, the mobile device 22 has the ability to establish a communications channel 130 (e.g., a communications connection or pathway, etc.) to the proxy equipment 24. Similarly, the external authentication server 26 and the proxy equipment 24 are able to establish a communications channel 132.

However, it should be further understood that there may be times in which a communications channel 130, 132 is not available thus putting one or more of the components in an offline state. For example, by its very nature as a portable apparatus, the mobile device 22 may enter a geographical location (or zone) that does not have wireless network or cellular coverage thus putting the mobile device 22 in an offline state with respect to the other components. As another example, the external authentication server 26 may become unavailable such as during servicing downtime, a hardware failure, or an unexpected loss of network access (i.e., a failure in the communications medium 28).

Nevertheless, once the mobile device 22 is able to obtain a valid OTP file 34, the user of the mobile device 22 is able to perform local user authentication to access protected resources even if the mobile device 22 is in an offline state. Further details of how the mobile device 22 is provisioned with an OTP file 34 will now be provided.

To obtain an OTP file 34, the user of the mobile device 22 runs the authentication application (or app) 112 on the processing circuitry 86 to perform remote user authentication with the external authentication server 26 via the proxy equipment 24. In particular, the processing circuitry 86 (running the authentication application 112) uses the network interface 82 to communicate with a listener process running on the mobile device module 30 of the proxy equipment 24. Along these lines, the user may possess a hardware token, and read an OTP 140 from the hardware token and manually enter the OTP 140 into the authentication application 112 running on the mobile device 22. Once the user-provided OTP 140 is entered into the authentication application 112, the authentication application 112 sends a signal 150 conveying the user-provided OTP 140 to the mobile device module 30 of the proxy equipment 24 through the communications channel 130.

Upon receipt of the user-provided OTP 140 from the mobile device 22, the listener process of the mobile device module 30 then sends a signal 152 containing the user-provided OTP 140 to the local authentication client 32 of the proxy equipment 24. The local authentication client 32 then sends, through the communications channel 132, an authentication request 154 containing the user-provided OTP 140 to the external authentication server 26 to authenticate with the external authentication server 26 on behalf of the user.

Upon successful authentication in which the external authentication server 26 successfully matches the user-provided OTP 140 with an expected OTP, the external authentication server 26 provides a signal 156 containing a successful authentication response and an OTP file 34 which holds multiple new expected OTPs (see FIG. 2) covering a predefined amount of time in the future (e.g., an hour, a day, three days, a week, etc.). The local authentication client 32 of the proxy equipment 24 receives the OTP file 34 from the external authentication server 26 through the communications channel 132 and temporarily buffers the OTP file 34 in the storage buffer 102. The local authentication client 32 then provides, to the mobile device module 30 of the proxy equipment 24, a signal 158 containing the successful authentication response and the OTP file 34. Upon receipt of the signal 158, the mobile device module 30 sends a signal 160 containing the successful authentication response and the OTP file 34 to the mobile device 22 through the communications channel 130.

Once the mobile device 22 receives the signal 160 with the successful authentication response and the OTP file 34, the mobile device 22 allows the user to access the protected computerized resource 114. In some situations, the protected computerized resource 114 resides within the mobile device 22 itself (e.g., a document, a game, a restricted app, etc.). In other situations, the protected computerized resource 114 resides within a remote device, which is external to the mobile device 22 (e.g., the other circuitry 100 of the proxy equipment, etc.).

Additionally, upon receipt of the OTP file 34, the mobile device 22 saves the OTP file 34 within the memory 88. Along these lines, it should be understood that the mobile device 22 is properly provisioned to protect the OTP file 34 against hacking/tampering in a manner which exposes the expected OTPs of the OTP file 34 or which enables someone to circumvent user authentication. As explained earlier and as will be explained in further detail shortly, once the mobile device 22 is provisioned with the OTP file 34, the mobile device 22 is able to perform mobile offline authentication without further communication with the proxy equipment 24 or the external authentication server 26.

It should be understood that, if authentication at the external authentication server 26 had been unsuccessful, an unsuccessful authentication response and no OTP file 34 would have been returned to the mobile device 22. In some situations, the app prompts the user to retry authentication. Furthermore, the app may apply a stronger authentication mechanism if the user attempts to gain access to more secure information (e.g., step up authentication).

In some arrangements, the OTP file 34 arrives at the local authentication client 32 of the proxy equipment 24 in encrypted form for security purposes. Then, when the local authentication client 32 provides the OTP file 34 to the mobile device module 30, the mobile device module 30 decrypts the OTP file 34 and sends the OTP file 34 to the mobile device 22 (via signal 160) in unencrypted form, but with additional protection provided by other mechanisms (e.g., encryption provided by the network layer such as SSL). Accordingly, the appropriate decryption provisioning (e.g., keys, algorithms, etc.) reside within the mobile device module 30.

In some arrangements, the authentication application 112 (i.e., the processing circuitry 86 running the authentication application 112) is configure delete an older OTP file 34 from the memory 88 (e.g., an OTP file 34 holding outdated expected OTPs) when storing a new OTP file 34 in the memory 88 (e.g., an OTP file 34 holding usable expected OTPs). In this situation, some of the expected OTPs in the older OTP file 34 may even be the same as some of the expected OTPs in the new OTP file 34 (i.e., the time periods covered by the OTP files 34 overlap). Additionally, in some arrangements, the authentication application 112 reports back to the external authentication server 26 any earlier-performed authentication operations and the authentication results to those operations in response to successful authentication and the newly received OTP file 34 while the communications channel 130 remains available. Further details of mobile offline authentication will now be provided with reference to FIG. 4.

Figure 4:
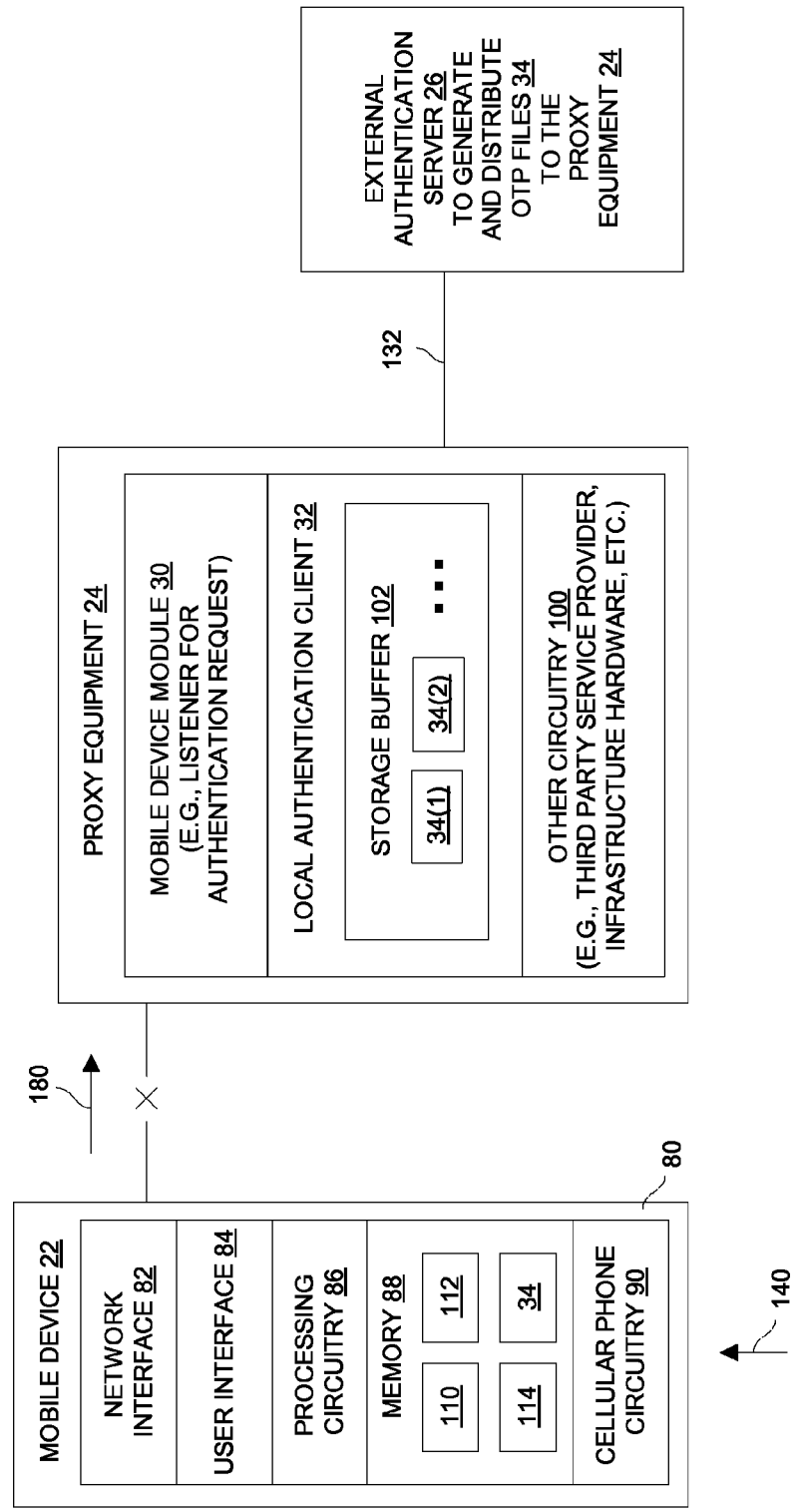
FIG. 4 is a block diagram illustrating another sequence of activities that occurs in an offline authentication situation.

FIG. 4 shows the mobile device 22 in an offline state where no communications channel exists to the proxy equipment 24. However, the mobile device 22 is now provisioned with the authentication application 112 and the OTP file 34 holding expected OTPs.

As shown in FIG. 4, the mobile device 22 may send a signal 180, but fail to contact the proxy equipment 24. For example, the mobile device 22 may have difficulty reaching cell tower or connecting to a wireless network (i.e., out of range). As another example, the authentication application 112 may read a parameter within the mobile device 22 indicating that external communications have been disabled or turned off. As yet another example, the mobile device 22 may have wireless access via WiFi and/or cellular signals, but the proxy equipment 24 may be unavailable.

In situations in which the mobile device 22 is in this offline state with respect to the proxy equipment 24, the processing circuitry 86 performs a local authentication operation using the OTP file 34 stored in the memory 88. In particular, the processing circuitry 88 runs the authentication application 112 which directs the user to enter an OTP 140 via the user interface 84. In response, the authentication application 112 compares the user-provided OTP 140 with one or more appropriate expected OTPs in the OTP file 34.

That is, the processing circuitry 86 obtains a current time value (e.g., from a clock circuit of the mobile device 22. The processing circuitry 86 then identifies, from the OTP file 34, particular time-indexed OTPs corresponding to windows of time covering the current time value (also see FIG. 2). Next, the processing circuitry 86 compares the user-provided OTP 140 to each time-indexed OTP of the particular time-indexed OTPs from the OTP file 34 to determine whether authentication of the user is successful or unsuccessful.

If there is a match, the authentication application 112 considers the user to have successfully authenticated in an offline manner and allows the user to access the protected computerized resource 114. In some situations, the authentication application 112 caches the authentication result and transmits the authentication result back to the external authentication server 26 via the proxy equipment 24 when the mobile device 22 transitions back to an online state. Further details will now be provided with reference to FIG. 5.

Figure 5:
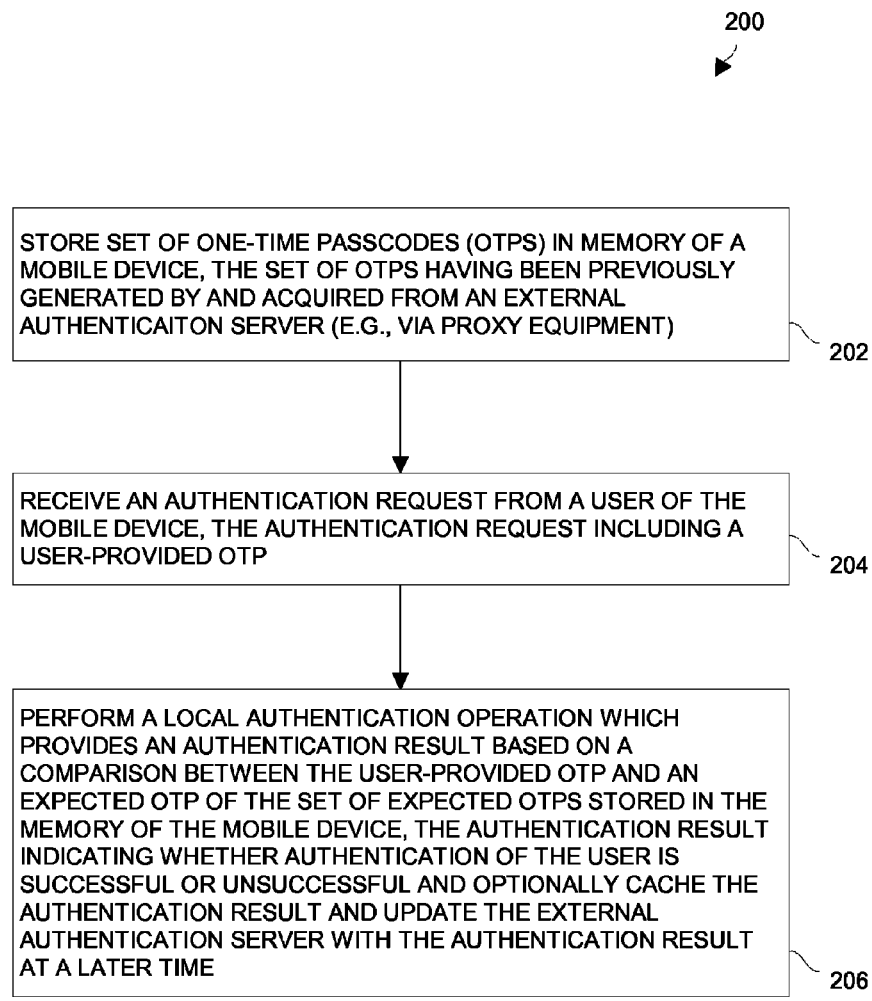
FIG. 5 is a flowchart of a procedure which is performed by a mobile device of the electronic environment of FIG. 1.

FIG. 5 is a flowchart of a procedure 200 which is performed by the processing circuitry 86 of a mobile device 22 of the electronic environment 20 (FIG. 1) when authenticating a user. In step 202, the processing circuitry 86 stores a set of OTPs in the memory 88 of the mobile device 22 (also see the OTP file 34 in FIG. 2). The set of expected OTPs were previously generated by and acquired from an external authentication server 26. In some arrangements, the external authentication server 26 generates the set of OTPs on the fly in response to an earlier remote authentication session. In other arrangements, the external authentication server 26 generates the set of OTPs periodically (e.g., nightly for a 24 hour period) in a proactive manner and the mobile device 22 obtains the set of OTPs from the proxy equipment 24 (FIG. 3) when the mobile device 22 comes online.

In step 204, after the set of expected OTPs is stored in the memory 88 of the mobile device 22, the processing circuitry 86 receives a new authentication request from a user of the mobile device 22. In particular, as part of providing the authentication request, the user inputs an OTP in the user interface 84 of the mobile device 22.

In step 206, the processing circuitry 86 performs a local authentication operation which provides an authentication result based on a comparison between the user-provided OTP and an expected OTP of the set of expected OTPs stored in the memory 88 of the mobile device 22. The authentication result indicates whether authentication of the user is successful or unsuccessful. In particular, the authentication result has (i) a first authentication value to indicate successful authentication when the user-provided OTP matches an appropriate time-indexed OTPs in the OTP file 34 and (ii) a second authentication value, which is different than the first authentication value, to indicate unsuccessful authentication when the user-provided OTP does not match any of the appropriate time-indexed OTPs in the OTP file 34 (FIG. 2).

As mentioned above, improved techniques involve locally authenticating users of mobile devices 22 by comparing user-provided OTPs with expected OTPs stored within the mobile devices 22. Such expected OTPs may be routinely generated by and distributed from external authentication servers 26 at times which are transparent to mobile device users (e.g., generated and distributed in a load balanced manner over a 24 hour period). Moreover, due to possible frequent online/offline transitions by the mobile devices 22, such expected OTPs can be buffered by proxy equipment 24, and then delivered from the proxy equipment 24 to the mobile devices 22 during online times of convenience.

While various embodiments of the present disclosure have been particularly shown and described, it will be understood by those skilled in the art that various changes in form and details may be made therein without departing from the spirit and scope of the present disclosure as defined by the appended claims.

For example, in order for a mobile device 22 to obtain an OTP file 34, it was described above that the user of the mobile device 22 needed to successfully authenticate with the external authentication server 34. In other arrangements, successfully authenticate with the external authentication server 34 is not required. For instance, in some arrangements, the proxy equipment 24 is constructed and arranged to perform authentication operations using the OTP files 34 before distributing the OTP files 34 to the mobile devices 22 (i.e., the proxy equipment 24 operates as a front-end to distribute OTP files 34 to respective mobile devices 22 on behalf of the external authentication server 34). In other arrangements, the mobile devices 22 simply receive the OTP files 34 from the proxy equipment 34 once the mobile devices 22 come online and provide proper identification. In yet other arrangements, the mobile devices 22 receive the OTP files 34 from the proxy equipment 34 in the background (i.e., transparently) when the mobile devices 22 automatically query the proxy equipment 24 in a periodic/scheduled manner (e.g., via a subscription service).

Additionally, it should be understood that the proxy equipment 24 and/or the external authentication server 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

What is claimed is:

1. In a mobile device, a method of authenticating a user, the method comprising:
   storing a set of expected one-time passcodes (OTPs) in memory of the mobile device, the set of expected OTPs having been previously generated by and acquired from an external authentication server;
   after the set of expected OTPs is stored in the memory of the mobile device, receiving an authentication request from a user of the mobile device, the authentication request including a user-provided OTP; and
   performing, by processing circuitry of the mobile device, a local authentication operation which provides an authentication result based on a comparison between the user-provided OTP and an expected OTP of the set of expected OTPs stored in the memory of the mobile device, the authentication result indicating whether authentication of the user is successful or unsuccessful;
   wherein storing the set of expected OTPs in the memory of the mobile device includes saving, in the memory of the mobile device, an OTP file holding multiple time-indexed OTPs as the set of OTPs, each time-indexed OTP corresponding to a respective window of time; and
   wherein performing the local authentication operation includes:
      obtaining a current time value,
      identifying, from the OTP file, particular time-indexed OTPs corresponding to windows of time covering the current time value, and
      comparing the user-provided OTP to each time-indexed OTP of the particular time-indexed OTPs to determine whether authentication of the user is successful or unsuccessful.

2. A method as in claim 1, further comprising:
   prior to saving the OTP file in the memory of the mobile device, acquiring the OTP file indirectly from the external authentication server via proxy equipment.

3. A method as in claim 2 wherein the proxy equipment includes (i) a mobile device module which is constructed and arranged to communicate with mobile devices and (ii) an authentication client module which is constructed and arranged to communicate with the external authentication server, the mobile device module and the authentication client module being linked together;
   wherein the authentication client module of the proxy equipment is constructed and arranged to receive the OTP file from the external authentication server and buffer the OTP file while the mobile device is offline from the perspective of the mobile device module of the proxy equipment; and
   wherein acquiring the OTP file indirectly from the external authentication server via the proxy equipment includes, after the OTP file is buffered by the authentication client module, establishing a communications channel between the mobile device and the mobile device module of the proxy equipment, and receiving the OTP file over the communications channel between the mobile device and the mobile device module of the proxy equipment.

4. A method as in claim 3 wherein the authentication client module of the proxy equipment is constructed and arranged to receive the OTP file from the external authentication server in encrypted form; and
   wherein receiving the OTP file over the communications channel between the mobile device and the mobile device module of the proxy equipment includes obtaining the OTP file from the mobile device module of the proxy equipment in unencrypted form following decryption of the OTP file by the proxy equipment.

5. A method as in claim 2 wherein acquiring the OTP file indirectly from the external authentication server via the proxy equipment includes:
   obtaining the OTP file during an authentication session in which the user successfully authenticates with the external authentication server through the proxy equipment.

6. A method as in claim 2 wherein acquiring the OTP file indirectly from the external authentication server via the proxy equipment includes:
   obtaining the OTP file during an authentication session in which the user successfully authenticates with the proxy equipment while the external authentication server is offline from the perspective of the mobile device.

7. A method as in claim 2 wherein acquiring the OTP file indirectly from the external authentication server via the proxy equipment includes:
   retrieving the OTP file from the proxy equipment automatically in response to the proxy equipment coming online from the perspective of the mobile device.

8. A method as in claim 2 wherein comparing the user-provided OTP to each time-indexed OTP of the particular time-indexed OTPs to determine whether authentication of the user is successful or unsuccessful includes:
   while the external authentication server is offline from the perspective of the mobile device, generating, as the authentication result, (i) a first authentication value to indicate successful authentication when the user-provided OTP matches one of the particular time-indexed OTPs and (ii) a second authentication value, which is different than the first authentication value, to indicate unsuccessful authentication when the user-provided OTP does not match any of the particular time-indexed OTPs.

9. A method as in claim 2 wherein comparing the user-provided OTP to each time-indexed OTP of the particular time-indexed OTPs to determine whether authentication of the user is successful or unsuccessful includes:

while the proxy equipment is offline from the perspective of the mobile device, generating, as the authentication result, (i) a first authentication value to indicate successful authentication when the user-provided OTP matches one of the particular time-indexed OTPs and (ii) a second authentication value, which is different than the first authentication value, to indicate unsuccessful authentication when the user-provided OTP does not match any of the particular time-indexed OTPs.

10. A method as in claim 2 wherein comparing the user-provided OTP to each time-indexed OTP of the particular time-indexed OTPs to determine whether authentication of the user is successful or unsuccessful includes:
while the external authentication server and the proxy equipment are both offline from the perspective of the mobile device, generating, as the authentication result, (i) a first authentication value to indicate successful authentication when the user-provided OTP matches one of the particular time-indexed OTPs and (ii) a second authentication value, which is different than the first authentication value, to indicate unsuccessful authentication when the user-provided OTP does not match any of the particular time-indexed OTPs.

11. A method as in claim 2, further comprising:
caching multiple authentication results within the memory of the mobile device, each of the multiple authentication results indicating whether a respective authentication attempt was successful or unsuccessful.

12. A method as in claim 11, further comprising:
after the multiple authentication results are cached within the memory of the mobile device, sending the multiple authentication results from the mobile device to the external authentication server through the proxy equipment.

13. A method as in claim 1 wherein saving the OTP file in the memory of the mobile device includes:
writing the OTP file to persistent storage of the mobile device, the written OTP file holding a series of time-indexed OTPs covering at least an upcoming contiguous 24 hour period.

14. A method as in claim 13 saving the OTP file in the memory of the mobile device further includes:
deleting, from the persistent storage, another OTP file holding an earlier series of time-indexed OTPs covering at least an earlier contiguous 24 hour period.

15. A method as in claim 14 wherein at least some of the series of time-indexed OTPs held in the OTP file and at least some of the earlier series of time-indexed OTPs held in the other OTP file cover the same window of time and are the same.

16. A method as in claim 1 wherein the mobile device includes cellular telephone circuitry which is integrated with the processing circuitry; and wherein the method further comprises:
establishing, by the cellular telephone circuitry, a cellular telephone call between the mobile device and an external telephone device independently of whether comparing the user-provided OTP to the particular time-indexed OTPs determines authentication of the user to be successful or unsuccessful.

17. A method as in claim 1, further comprising:
prior to performing the local authentication operation, operating in an online state in which the mobile device communicates with an authentication server via a wireless network to authenticate the user; and
in response to loss of wireless network access, transitioning from the online state to an offline state in which the mobile device performs the local authentication operation to authenticate the user.

18. A mobile device, comprising:
a mobile device housing having a handheld form factor;
a wireless interface disposed within the mobile device housing;
a user interface supported by the mobile device housing;
memory disposed within the mobile device housing; and
processing circuitry disposed within the mobile device housing, the processing circuitry being coupled to the wireless interface, the user interface and the memory, and the processing circuitry being constructed and arranged to:
store a set of expected one-time passcodes (OTPs) in the memory, the set of expected OTPs having been previously generated by and acquired from an external authentication server through the wireless interface,
after the set of expected OTPs is stored in the memory, receive an authentication request from a user through the user interface, the authentication request including a user-provided OTP, and
perform a local authentication operation which provides an authentication result based on a comparison between the user-provided OTP and an expected OTP of the set of expected OTPs stored in the memory, the authentication result indicating whether authentication of the user is successful or unsuccessful;
wherein the processing circuitry, when storing the set of expected OTPs in the memory, is constructed and arranged to save, in the memory, an OTP file holding multiple time-indexed OTPs as the set of OTPs, each time-indexed OTP corresponding to a respective window of time; and
wherein the processing circuitry, when performing the local authentication operation, is constructed and arranged to:
obtain a current time value,
identify, from the OTP file, particular time-indexed OTPs corresponding to windows of time covering the current time value, and
compare the user-provided OTP to each time-indexed OTP of the particular time-indexed OTPs to determine whether authentication of the user is successful or unsuccessful.

19. A computer program product having a non-transitory computer readable medium which stores a set of instructions to authenticate a user, the set of instructions, when carried out by processing circuitry of a mobile device, causing the processing circuitry to perform a method of:
storing a set of expected one-time passcodes (OTPs) in memory of the mobile device, the set of expected OTPs having been previously generated by and acquired from an external authentication server;
after the set of expected OTPs is stored in the memory of the mobile device, receiving an authentication request from the user, the authentication request including a user-provided OTP; and
performing, by the processing circuitry, a local authentication operation which provides an authentication result based on a comparison between the user-provided OTP and an expected OTP of the set of expected OTPs stored in the memory of the mobile device, the authentication result indicating whether authentication of the user is successful or unsuccessful;
wherein storing the set of expected OTPs in the memory of the mobile device includes saving, in the memory of the mobile device, an OTP file holding multiple time-indexed OTPs as the set of OTPs, each time-indexed OTP corresponding to a respective window of time; and wherein performing the local authentication operation includes:
obtaining a current time value,
identifying, from the OTP file, particular time-indexed OTPs corresponding to windows of time covering the current time value, and
comparing the user-provided OTP to each time-indexed OTP of the particular time-indexed OTPs to determine whether authentication of the user is successful or unsuccessful.

20. In proxy equipment, a method of delivering a set of expected one-time passcodes (OTPs) from an external authentication server to a mobile device to enable user authentication, the method comprising:
receiving, by a local authentication client of the proxy equipment, the set of expected OTPs through a first communications channel established between the local authentication client and the external authentication server;
buffering, at least temporarily, the set of OTPs in dedicated memory of the local authentication client of the proxy equipment; and
conveying, by a mobile device module of the proxy equipment, the set of expected OTPs from the dedicated memory of the local authentication client to the mobile device through a second communications channel established between the mobile device module and the mobile device;
wherein conveying the set of expected OTPs includes saving, in memory of the mobile device, an OTP file holding multiple time-indexed OTPs as the set of OTPs, each time-indexed OTP corresponding to a respective window of time; and
wherein the OTP file enables the mobile device to perform a local authentication operation by:
obtaining a current time value,
identifying, from the OTP file, particular time-indexed OTPs corresponding to windows of time covering the current time value, and
comparing a user-provided OTP to each time-indexed OTP of the particular time-indexed OTPs to determine whether authentication of a user is successful or unsuccessful.

* * * * *